United States Patent [19]  
Graton et al.

[11] Patent Number: 4,697,683  
[45] Date of Patent: Oct. 6, 1987

[54] CLUTCH FRICTION DISK

[75] Inventors: Michel Graton, Paris, France; Roger F. Carmillet, Birmingham, Mich.

[73] Assignee: Valeo, Paris, France

[21] Appl. No.: 739,373

[22] Filed: May 30, 1985

[30] Foreign Application Priority Data

May 30, 1984 [FR] France ................ 84 08526

[51] Int. Cl.$^4$ .......................................... F16D 13/69
[52] U.S. Cl. ................................................ 192/107 C
[58] Field of Search ............ 192/107 C, 109 R, 70.11; 188/73.38, 250 G

[56] References Cited

U.S. PATENT DOCUMENTS

| | | | |
|---|---|---|---|
| 1,981,505 | 11/1934 | Goodwin | 192/107 C |
| 2,256,698 | 9/1941 | Wolfram | 192/107 C |
| 2,256,709 | 9/1941 | Geyer | 192/107 C |
| 2,256,713 | 9/1941 | Hunt | 192/107 C |
| 2,337,097 | 12/1943 | Geyer | 192/107 C |
| 2,524,146 | 10/1950 | Thelander | 192/107 C |
| 2,534,991 | 12/1950 | Reed | 192/107 C |
| 2,630,199 | 3/1953 | Gamble | 192/107 C |
| 2,812,842 | 11/1957 | Thelander | 192/107 C |
| 4,345,676 | 8/1982 | Jarvis | 192/107 C |

FOREIGN PATENT DOCUMENTS 866176 6/1941 France .  
2453318 10/1980 France .

Primary Examiner—Rodney H. Bonck  
Assistant Examiner—David A. Testardi  
Attorney, Agent, or Firm—Charles E. Brown; Charles A. Brown

[57] ABSTRACT

A clutch disk comprises an annular plane support member at the periphery of which are elastically deformable parts adapted to deform when the disk is subjected to axial compression. Two friction facing members are disposed one on each side of the support member and locally attached to the deformable parts. Thus the portion of the disk comprising the friction facing members is elastically compressible between an expanded inoperative configuration and a flattened operative configuration. The deformable parts are substantially plane in the inoperative configuration. The friction facing members have inside surfaces on which are bosses alternating with recesses and the friction facing members are attached to the deformable parts by means of these bosses. The bosses on each friction facing member are aligned with the recesses on the other member. Thus compressing the disk from its inoperative configuration to its operative configuration causes elastic deformation of the deformable parts by virtue of interpenetration of the bosses and the recesses in the axial direction. Each boss is stepped and the recesses are wider than the bosses, so that voids are provided between the edges of the recesses and the edges of the bosses whereby elastic deformation of the deformable parts occurs in at least two successive stages. In one stage the deformable parts first cover and envelope the bosses, and in the other these parts continue to cover the bosses but are able to bend further by virtue of the voids.

22 Claims, 8 Drawing Figures

CLUTCH FRICTION DISK

BACKGROUND OF THE INVENTION

1. Field of the Invention

The present invention relates to a clutch friction disk comprising an annular plane support member having at its periphery elastically deformable parts which are adapted to deform when the disk is subjected to axial compression and two friction facing members disposed one on each side of the support member and locally attached to said deformable parts whereby the thickness of the portion of the disk comprising the friction facing members is elastically compressible between an expanded inoperative configuration and a flattened operative configuration.

Because of the requirements for deformation the elastically deformable parts are subdivided into vanes. The friction facing members either consist of two continuous annular members or are also subdivided into vanes.

Be this as it may, clutch friction disks of this type permit progressive engagement when the clutch disk is compressed.

2. Description of the Prior Art

It has already been proposed to confer a wave-like shape on the deformable parts in the inoperative configuration, whereas the friction facing members are flat and the wave-shape deformable parts are adapted to flatten when compressed between the friction facing members.

A reverse arrangement has also been proposed in order to reduce the unit cost, in which the deformable parts are plane in the inoperative configuration whereas the inside surfaces of the friction facing members feature recesses and complementary bosses between which the deformable parts are able to assume a wave-like shape when the disk is compressed.

Generally speaking, however, an arrangement of this kind does not provide for conferring on the required progressive functioning the optimum characteristic or, more generally, the most desirable characteristic for each particular instance.

An object of the present invention is a clutch friction disk of the type indicated hereinabove which, with a very simple and convenient construction, enables any required characteristic to be conferred on the progressive functioning, with a view to improved functioning of the disk.

SUMMARY OF THE INVENTION

The invention consists in a clutch disk comprising an annular plane support member having at its periphery elastically deformable parts which are adapted to deform when the disk is subjected to axial compression and two friction facing members disposed one on each side of said support member and locally attached to said deformable parts whereby the thickness of the portion of the disk comprising said friction facing members is elastically compressible between an expanded inoperative configuration and a flattened operative configuration, wherein said deformable parts are substantially plane in said inoperative configuration, said friction facing members have inside surfaces on which are bosses alternating with recesses and said friction facing members are locally attached to said deformable parts by said bosses, said bosses on each of said friction facing members are aligned with said recesses on the other of said friction facing members so that compressing the disk from its inoperative configuration into its operative configuration causes elastic deformation of said deformable parts by virtue of interpenetration of said bosses and said recesses in the axial direction, each boss is stepped and said recesses are wider than said bosses, whereby voids are provided between the edges of said recesses on each other friction facing members and the edges of said bosses on this other of the friction facing members so that said elastic deformation of said deformable parts occurs in at least two successive stages, in one of which said deformable parts first cover and envelope said bosses and in the other of which said deformable parts continue to cover said bosses but are able to bend further by virtue of said voids.

By virtue of this arrangement, the progressive functioning of the disk is adapted to obey a law which is extremely favorable to the functioning of the disk, whereby the elastic resistance to compression of the disk is initially relatively low and then becomes higher, which provides for excellent working conditions.

The stepped shape of each boss enables the deformable parts to deform under favorable conditions.

The deformable parts are preferably fixed to the bosses by rivets, either directly according to the usual fastening method using rivets, or by virtue of an advantageous specific arrangement whereby each rivet is incorporated into a base bonded to the top of the boss and is stamped over the deformable part of the support.

In order to simplify manufacture of the friction facing members which comprise the recesses and the bosses, in a preferred embodiment each friction facing member comprises an outside layer of uniform thickness and separate members fastened to the outside layer to constitute the bosses, the recesses being defined by those areas of the inside surface of the outside layer which are devoid of said separate members. In this way manufacture is very simple, beginning with friction facing members of uniform thickness to which are simply bonded relief members to constitute the bosses.

In one advantageous embodiment, the deformable parts are fixed to the bosses by rivets which are fast with the bosses and which are stamped over said deformable parts. In this case, the bosses are advantageously of metal, which enables them to carry the rivets directly.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Reference will first be made to FIGS. 1 through 4 which concern, by way of non-limiting example, one application of the invention to a friction disk designed to be fitted to an automobile vehicle clutch. The friction disk is adapted to be selectively clamped between two plates of the clutch.

Figure 4:
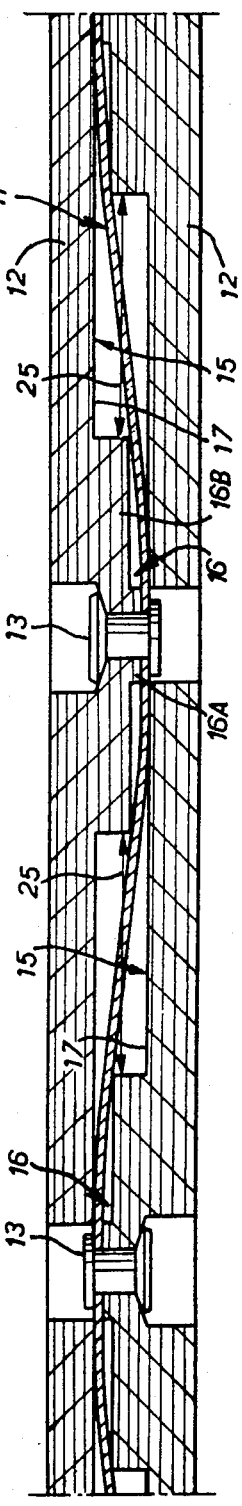
FIG. 4 is a view analogous to FIG. 2 or FIG. 3, in which the disk is completely compressed.

The clutch friction disk comprises (FIG. 1) a metal support 10 of generally plane annular shape perpendicular to the axis of the disk. The support 10 features at its periphery deformable parts 11 which can deform against elastic resistance when the disk is compressed between the plates of the clutch. The disk further comprises facing members 12 of a friction material disposed one on each side of the support 10 and fastened by rivets 13 to the deformable parts 11, so that the thickness of the part of the disk comprising the facing members 12 is elastically compressible between an expanded inoperative configuration (FIG. 2) and a flattened operative configuration (FIG. 4).

Figure 1:
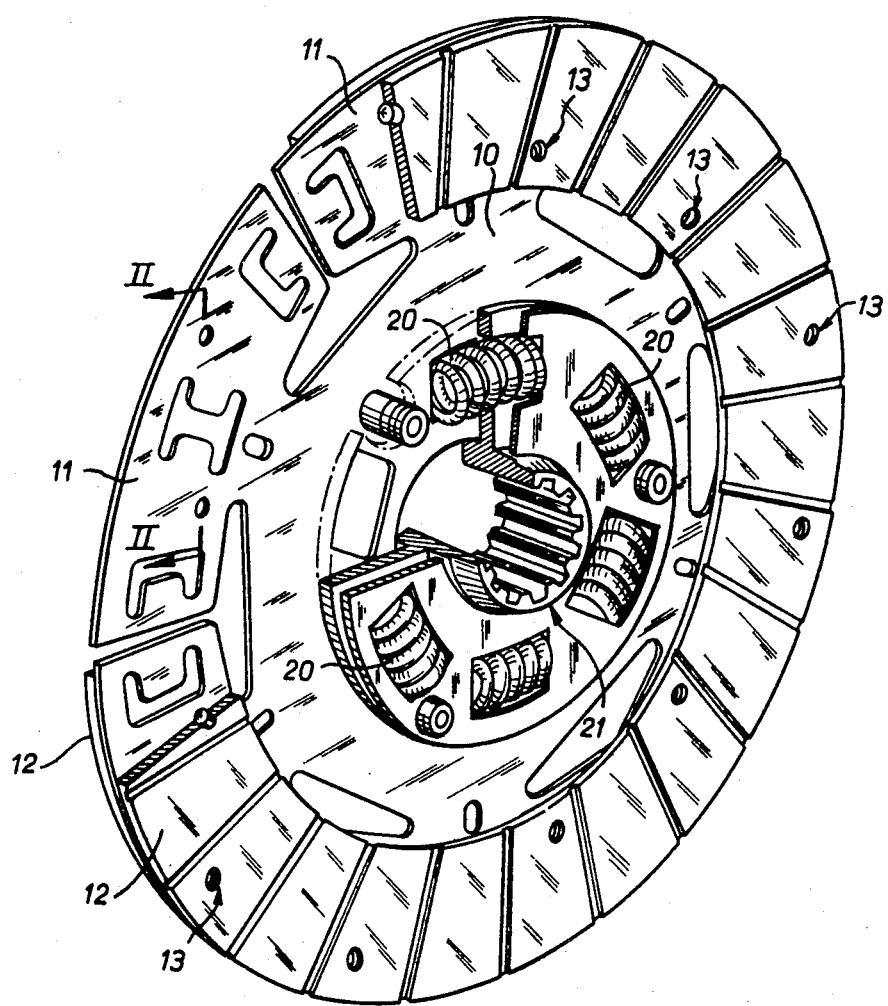
FIG. 1 is a partially cutaway general view in perspective of a clutch friction disk in accordance with the invention.
Figure 2:
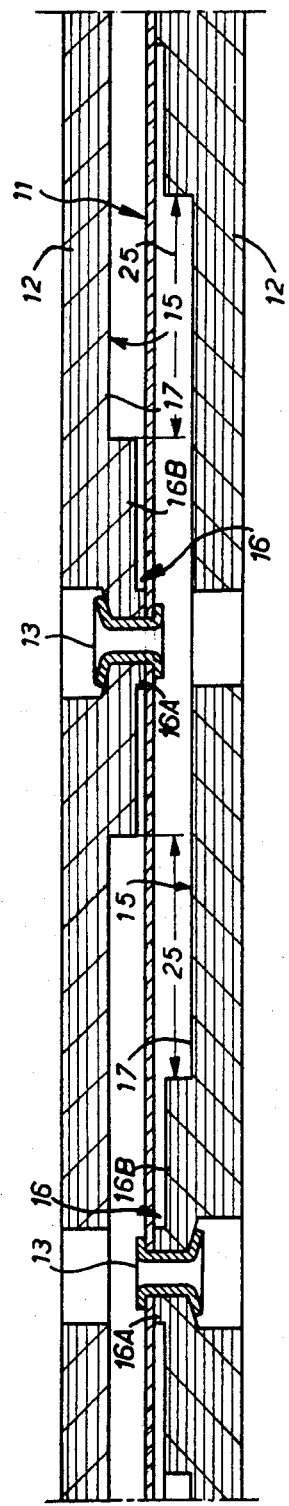
FIG. 2 is a partial view to a larger scale of the disk in cross-section on the line II—II in FIG. 1, the disk being shown in the uncompressed configuration.
Figure 3:
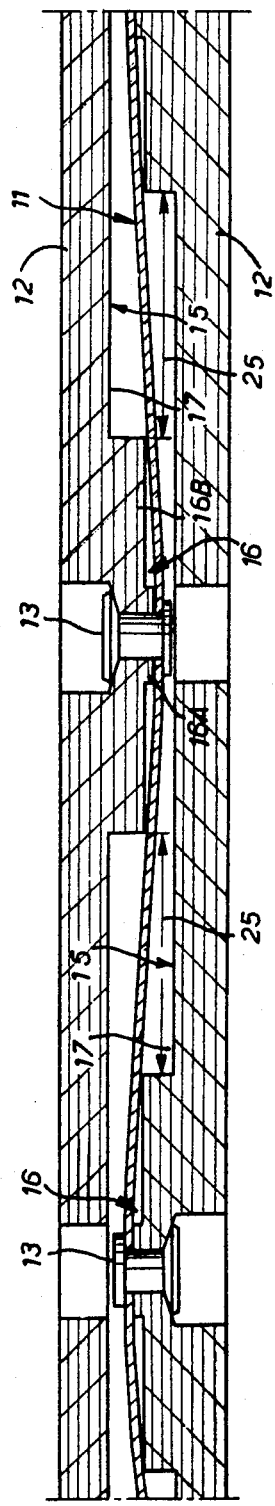
FIG. 3 is a view analogous to FIG. 2, in which the disk is partially compressed.

The deformable parts 11 are substantially plane in the inoperative configuration (FIG. 2). The inside surfaces 15 of the facing members 12 comprise bosses 16 alternating with recesses 17. The friction facing members 12 are locally fixed by the rivets 13, through the bosses 16, to the deformable parts 11. The bosses 16 on the inside surface 15 of one of the facing members 12 are disposed opposite the recesses 17 in the inside surface 15 of the other facing member 12, and vice versa, so that compression of the disk between the inoperative and operative configurtions causes elastic deformation of the deformable parts by virtue of interpenetration of the bosses 16 and the recesses 17 in the axial direction (FIGS. 2 through 4).

The support 10 (FIG. 1) is coupled through the intermediary of torsional damper springs 20 to a splined hub 21 which is adapted to be engaged over a shaft so that it is driven by the plates of the clutch when the disk is clamped between these plates and to be uncoupled from said plates when the latter release the disk.

As is seen in FIG. 2, the recesses 17 are wider than the bosses 16 and form between themselves and the latter voids 25 so that the deformation occurs in at least two successive phases: in one of these phases (FIGS. 2 and 3) the deformable parts 11 initially cover the bosses 16 and envelope them; in the other phase (FIGS. 3 and 4) the deformable parts 11, continuing to cover the bosses 16, are able to bend further into the voids 25.

More precisely, each of the bosses 16 is of stepped shape and comprises a first level 16A and a second level 16B, recessed relative to the first level, the inside surface being recessed relative to this second level 16B.

In this way, in the inoperative configuration (FIG. 2) the deformable parts 11 are plane, as indicated hereinabove, and held flat against the first level 16A by rivets 13. In this state the deformable parts are highly resilient and are able to deform between the first levels 16A of the successive bosses 16. On deformation of the deformable parts 11, as shown in FIG. 3, they abut against the edge at the periphery of the second level 16B of each boss, the effect of which is to increase the effective stiffness of the deformable parts 11. This deformation of the deformable parts 11 is able to continue until the part of the inside surface 15 opposite each boss comes into contact with the regions of the deformable parts surrounding the rivets 13 as shown in FIG. 4. In this position the stiffness of the deformable parts has its maximum value.

By virtue of this arrangement, there is obtained a progressive functioning with an optimum characteristic whereby, at the commencement of compression of the disk, the deformable parts 11 offer only a low elastic resistance, whereas subsequently this elastic resistance increases, which provides excellent operating conditions.

Figure 5:
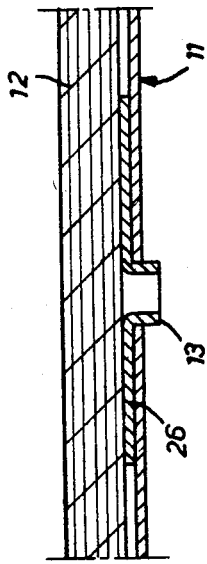
FIG. 5 concerns an alternative embodiment of fastening rivet, prior to stamping.
Figure 6:
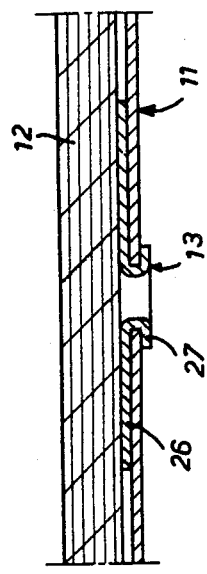
FIG. 6 is a view analogous to FIG. 5, but after stamping.

An alternative arrangement (FIGS. 5 and 6) is analogous to that which as just been described with reference to FIGS. 1 through 4, but each rivet 13 is incorporated into a base 26 bonded to the top of the boss 16 and is stamped over the deformable part 11 of the support 10 at 27 (FIG. 6).

In another alternative arrangement (FIG. 7), each facing member 12 comprises an outside layer 28 of uniform thickness to which are fixed separate members 29 which thus constitute the bosses 16. The recesses 17 are defined by the regions of the inside surface of the layer 28 which are devoid of the members 29. The particularly convenient and economical structure of FIG. 7 will be realised.

Figure 7:
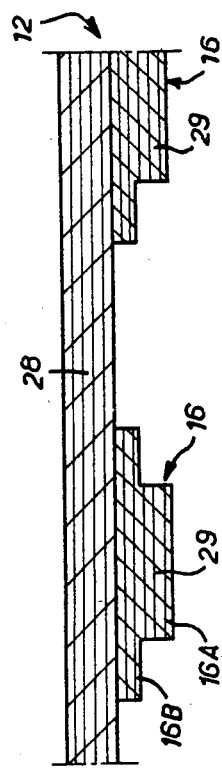
FIG. 7 concerns another alternative embodiment, in which the friction facing members consist of a layer of uniform thickness to which are bonded bosses consisting of separate members.
Figure 8:
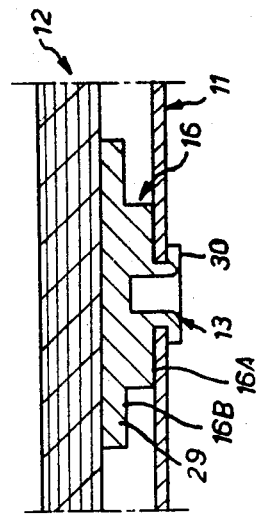
FIG. 8 concerns a further embodiment in which the bosses consist of separate members bonded to a layer of uniform thickness and carry integral fixing rivets.

Another alternative arrangement (FIG. 8) is analogous to that which has just been described with reference to FIG. 7, with separate members 29 constituting the bosses 16, but in this instance the rivets 13 are integral with the separate members 29. The rivets 13 are stamped over the deformable parts 11 at 30, as shown in FIG. 8.

It will be understood that various changes in the details, materials and arrangements of parts which have been herein described and illustrated in order to explain the nature of the invention may be made by those skilled in the art within the principle and scope of the invention as expressed in the appended claims.

There is claimed:

1. Clutch disk comprising an annular plane support member having at its outer periphery elastically deformable parts which are adapted to deform when the disk is subjected to axial compression and two friction facing members disposed one on each side of said support member and locally attached to said deformable parts whereby the thickness of the portion of the disk comprising said friction facing members is elastically compressible between an expanded inoperative configuration and a flattened operative configuration, wherein said deformable parts are substantially plane in said inoperative configuration, said friction facing members having on inside surfaces thereof stepped bosses circumferentially alternating with recesses and said friction facing members being locally attached to said deformable parts by said bosses, said bosses on each of said friction facing members being aligned with said recesses on the other of said friction facing members so that compressing the disk from its inoperative configuration into its operative configuration causes elastic deformation of said deformable parts by virtue of interpenetration of said bosses and said recesses in the axial direction, said bosses having a first axially innermost level and a second level axially set back from said first level, a first shoulder being defined between said first and second level of said bosses, a second shoulder being defined between said second level of said bosses and said recesses, said deformable parts being fixed to said first level of said bosses, said deformable parts being engageable with said second shoulders in the course of flattening of the friction disk, said deformable parts having successive stages of operation, including a first stage wherein said deformable parts are freely bendable on said first levels, and a second stage wherein said deformable parts engage said second shoulder for flexing said deformable parts between said second shoulders and increasing the stiffness of the deformable parts.

2. Device according to claim 1, wherein said deformable parts are riveted to said bosses.

3. Device according to claim 2, further comprising a base bonded to the top of each boss and incorporating a rivet to which the corresponding deformable part is fastened.

4. Device according to claim 1, wherein each friction facing member comprises an outside layer of generally uniform thickness and separate members fastened to the inside surface of said outside layer to constitute said bosses, and said recesses are formed by those areas of the inside surface of said outside layer devoid of said separate members.

5. Device according to claim 4, wherein said bosses incorporate rivets to which said deformable parts are fastened.

6. Clutch disk according to claim 1, wherein said bosses are formed of friction material and in one piece with their respective friction facing members.

7. Clutch disk according to claim 6, wherein rivets attach said deformable parts to said bosses.

8. Clutch disk according to claim 1, wherein said bosses are formed of friction material fixed to said facing members.

9. Clutch disk according to claim 8, wherein said friction facing members comprise an axially outer layer of generally uniform thickness and separate members fixed to said outer layer and defining said bosses, and said voids are defined by zones between adjacent ones of said bosses devoid of said separate members.

10. Clutch disk according to claim 9, wherein said separate members define rivets for fixing said deformable parts.

11. Clutch disk comprising an annular plane support member having at its outer periphery elastically deformable parts which are adapted to deform when the disk is subjected to axial compression and two friction facing members disposed one on each side of said support member and locally attached to said deformable parts whereby the thickness of the portion of the disk comprising said friction facing members is elastically compressible between an expanded inoperative configuration and a flattened operative configuration, wherein said deformable parts are substantially plane in said inoperative configuration, said friction facing members having on inside surfaces thereof stepped bosses circumferentially alternating with recesses and said friction facing members being locally attached to said deformable parts by said bosses, said bosses on each of said friction facing members being aligned with said recesses on the other of said friction facing members so that compressing the disk from its inoperative configuration into its operative configuration causes elastic deformation of said deformable parts by virtue of interpenetration of said bosses and said recesses in the axial direction, said bosses having a first axially innermost level, said deformable parts being fixed to said first levels of said bosses, said bosses having a second level axially set back with respect to the first level, shoulders being formed between said recesses and adjacent ones of said bosses on the respective friction facing members, said deformable parts having a first operating stage of relatively low stiffness between said inoperative configuration of the disk in which said deformable parts are substantially plane and a position in which said shoulders engage said deformable parts, and a second stage of greater stiffness after said deformable parts engage said shoulders until the disk reaches its entirely flattened configuration.

12. Clutch disk according to claim 11, wherein rivets are bonded to the first levels of said bosses and extend through and are bent over against said deformable parts.

13. Clutch disk according to claim 11, wherein said deformable parts fixed to said bosses are adapted to engage the opposite friction facing member to define the end of said second stage.

14. Device according to claim 11, wherein said deformable parts are riveted to said bosses.

15. Device according to claim 14, further comprising a base bonded to the top of each boss and incorporating a rivet to which the corresponding deformable part is fastened.

16. Device according to claim 11, wherein each friction facing member comprises an outside layer of generally uniform thickness and separate members fastened to the inside surface of said outside layer to constitute said bosses, and said recesses are formed by areas of the inside surface of said outside layer devoid of said separate members.

17. Device according to claim 16, wherein said bosses incorporate rivets to which said deformable parts are fastened.

18. Clutch disk according to claim 11, wherein said bosses are formed of friction material and in one piece with their respective friction facing members.

19. Clutch disk according to claim 18, wherein rivets attach said deformable parts to said bosses.

20. Clutch disk according to claim 11, wherein said bosses are formed of friction material fixed to said friction facing members.

21. Clutch disk according to claim 11, wherein said friction facing members comprise an axially outer layer of generally uniform thickness and separate members fixed to said outer layer and defining said bosses and said voids are defined by zones between adjacent ones of said bosses devoid of said separate members.

22. Clutch disk according to claim 21, wherein said separate members define rivets for fixing said deformable parts thereto.

* * * * *